(12) United States Patent
Byström (10) Patent No.: US 10,989,444 B2
(45) Date of Patent: Apr. 27, 2021

(54) SOLAR TRACKING ARRANGEMENT FOR CONTROLLING PARABOLIC TROUGH SOLAR COLLECTORS, AND A THERMAL SOLAR ENERGY SYSTEM

(71) Applicant: ABSOLICON SOLAR COLLECTOR AB, Härnösand (SE)

(72) Inventor: Joakim Byström, Härnösand (SE)

(73) Assignee: ABSOLICON SOLAR COLLECTOR AB, Härnösand (SE)

(*) Notice: Subject to any disclaimer, the term of this patent is extended or adjusted under 35 U.S.C. 154(b) by 0 days.

(21) Appl. No.: 16/640,880

(22) PCT Filed: Sep. 3, 2018

(86) PCT No.: PCT/SE2018/050882
§ 371 (c)(1),
(2) Date: Feb. 21, 2020

(87) PCT Pub. No.: WO2019/054912
PCT Pub. Date: Mar. 21, 2019

(65) Prior Publication Data
US 2020/0355401 A1    Nov. 12, 2020

(30) Foreign Application Priority Data
Sep. 14, 2017 (SE) .................... 1751126-2

(51) Int. Cl.
*F24S 30/425* (2018.01)
*F16H 19/06* (2006.01)
(Continued)

(52) U.S. Cl.
CPC ........ *F24S 30/425* (2018.05); *F16H 19/0622* (2013.01); *F16H 21/40* (2013.01); *F16H 19/04* (2013.01); *F24S 23/71* (2018.05)

(58) Field of Classification Search
CPC .... F24S 30/425; F24S 23/71; F24S 2030/133; F24S 2030/136; F16H 21/40; F16H 19/0622; F16H 19/04
See application file for complete search history.

(56) References Cited

U.S. PATENT DOCUMENTS 1,946,184 A  *  2/1934  Abbot ..................... F24S 23/00
                                                      126/603
4,077,392 A  *  3/1978  Garner .................... F24S 23/74
                                                      126/600
(Continued)

FOREIGN PATENT DOCUMENTS

AT          506839 A1    12/2009
AU          7189181 A    12/1981
(Continued)

OTHER PUBLICATIONS

International Search Report/Written Opinion in related/corresponding PCT Application No. PCT/SE2018/050882 dated Nov. 20, 2018.
(Continued)

*Primary Examiner* — Jorge A Pereiro
(74) *Attorney, Agent, or Firm* — Patent Portfolio Builders PLLC (57) ABSTRACT

The solar tracking arrangement enables a plurality of parallel arranged PTCs to be directed towards the travelling sun. The solar tracking arrangement comprises a drive means, a transmission means, and a plurality of conversion means. The transmission means are connected with the drive means and to each of the plurality of conversion means. The transmission means is configured to convey an operating movement caused by the drive means to the plurality of conversion means, and each of the conversion means is configured to convert the conveyed operating movement into a pivoting movement of a respective one of the plurality (Continued)

of PTCs about a focus line, such that each of the pivoting movements directs the respective PTC towards the travelling sun. One or more of the conversion means are adjustably connected with the transmission means in a direction along the transmission means.

17 Claims, 8 Drawing Sheets

(51) Int. Cl.
    *F16H 21/40*     (2006.01)
    *F24S 23/71*     (2018.01)
    *F16H 19/04*     (2006.01)

(56) References Cited

U.S. PATENT DOCUMENTS

| | | | |
|---|---|---|---|
| 4,095,369 A | | 6/1978 | Posnansky et al. |
| 4,108,154 A | * | 8/1978 | Nelson .................... F24S 25/70 |
| | | | 126/576 |
| 4,109,638 A | * | 8/1978 | Matlock ................ F24S 30/452 |
| | | | 126/605 |
| 4,114,594 A | | 9/1978 | Meyer |
| 4,153,039 A | * | 5/1979 | Carroll .................... F24S 90/00 |
| | | | 126/605 |
| 4,432,343 A | * | 2/1984 | Riise ........................ F24S 40/80 |
| | | | 126/602 |
| 4,469,938 A | * | 9/1984 | Cohen .................... G01S 3/7861 |
| | | | 250/203.4 |
| 4,559,926 A | * | 12/1985 | Butler ....................... F24S 50/20 |
| | | | 126/578 |
| 4,628,142 A | * | 12/1986 | Hashizume ........... G01S 3/7861 |
| | | | 136/246 |
| 4,832,002 A | * | 5/1989 | Medina ................. F24S 30/455 |
| | | | 126/577 |
| 4,968,355 A | * | 11/1990 | Johnson .................. F24S 23/31 |
| | | | 136/246 |
| 5,169,456 A | * | 12/1992 | Johnson ................. G01S 3/7861 |
| | | | 136/246 |
| 8,950,336 B2 | * | 2/2015 | Camp ...................... B61B 13/04 |
| | | | 104/119 |
| 9,494,341 B2 | * | 11/2016 | Trujillo ........................ B25J 5/02 |
| 2002/0007830 A1 | | 1/2002 | Fukutake et al. |
| 2009/0078248 A1 | * | 3/2009 | Brown .................... F24S 23/71 |
| | | | 126/600 |
| 2011/0203574 A1 | * | 8/2011 | Harding .................. F24S 50/40 |
| | | | 126/595 |
| 2012/0111389 A1 | * | 5/2012 | Park ........................ H02S 20/10 |
| | | | 136/246 |
| 2013/0056000 A1 | * | 3/2013 | Perrin .................... F24S 30/425 |
| | | | 126/606 |
| 2013/0298897 A1 | | 11/2013 | Kawane et al. |
| 2015/0107583 A1 | | 4/2015 | Doyle |
| 2015/0144125 A1 | | 5/2015 | Behrens |
| 2015/0377520 A1 | * | 12/2015 | Kufner .................... F24S 50/20 |
| | | | 126/605 |
| 2016/0365830 A1 | * | 12/2016 | Bailey ...................... H02S 20/32 |
| 2017/0179874 A1 | * | 6/2017 | Knox .................... F24S 30/458 |
| 2018/0164560 A1 | * | 6/2018 | Olsen ................. G02B 19/0023 |

FOREIGN PATENT DOCUMENTS

| | | |
|---|---|---|
| CN | 106208945 A | 12/2016 |
| EP | 2466225 A1 | 6/2012 |
| EP | 2886974 A1 | 6/2015 |
| FR | 2376378 A1 | 7/1978 |
| WO | 9013147 A1 | 11/1990 |
| WO | 2010032095 A2 | 3/2010 |
| WO | 2011074893 A2 | 6/2011 |
| WO | 2012046134 A1 | 4/2012 |

OTHER PUBLICATIONS

Search Report in corresponding Swedish Application No. 1751126-2 dated May 29, 2019.

* cited by examiner

Fig.1
(Existing art)

SOLAR TRACKING ARRANGEMENT FOR CONTROLLING PARABOLIC TROUGH SOLAR COLLECTORS, AND A THERMAL SOLAR ENERGY SYSTEM

TECHNICAL FIELD

This disclosure relates to energy supply, especially to construction solutions in systems for solar energy production.

BACKGROUND

In modern society energy is consumed by people and industries, e.g. for producing various products, for transport and production of food. Energy could be produced in several forms and from different energy sources. For instance, electricity is often produced from hydroelectric power plants, combustion of coal, oil, or gas. Traditionally, heat has been produced from local combustion or district heating power plants.

With an increasing population and demands for services, energy consumption strongly increases which negatively affects our environment significantly in a negative way. Combustion produces large amount of carbon dioxide and other greenhouse gases. Hydroelectric power plants require large territories to be drowned, etc.

In order to reduce our footprint and negative impression on our environment, demands have been raised for more clean and environmental friendly energy production. Today, renewable energy is produced from wind, sun, ocean waves, etc. The sun provides large amounts of energy to our planet in form of radiated sun beams. Solar radiation can be used by solar cells to generate electricity, e.g. in form of solar panels, or by solar collectors to generate thermal heat.

A concentrating solar collector uses mirrors, lenses, or combinations thereof, to focus the solar radiation in form of a point or a line. In trough-formed concentrating solar collectors a reflector is formed as a curved elongated mirror, which reflects the solar radiation on a receiver arranged along a focus-line of the reflector. The receiver is commonly a black tube filled with a transport fluid, such as water, glycol, or oil. The tube is heated by the concentrated solar radiation and the heat is transferred to the transport fluid that is circulated in a system where the hot transport fluid could be used. The heated transport fluid may be used both as process heat in industrial processes as in district heating.

Figure 1:
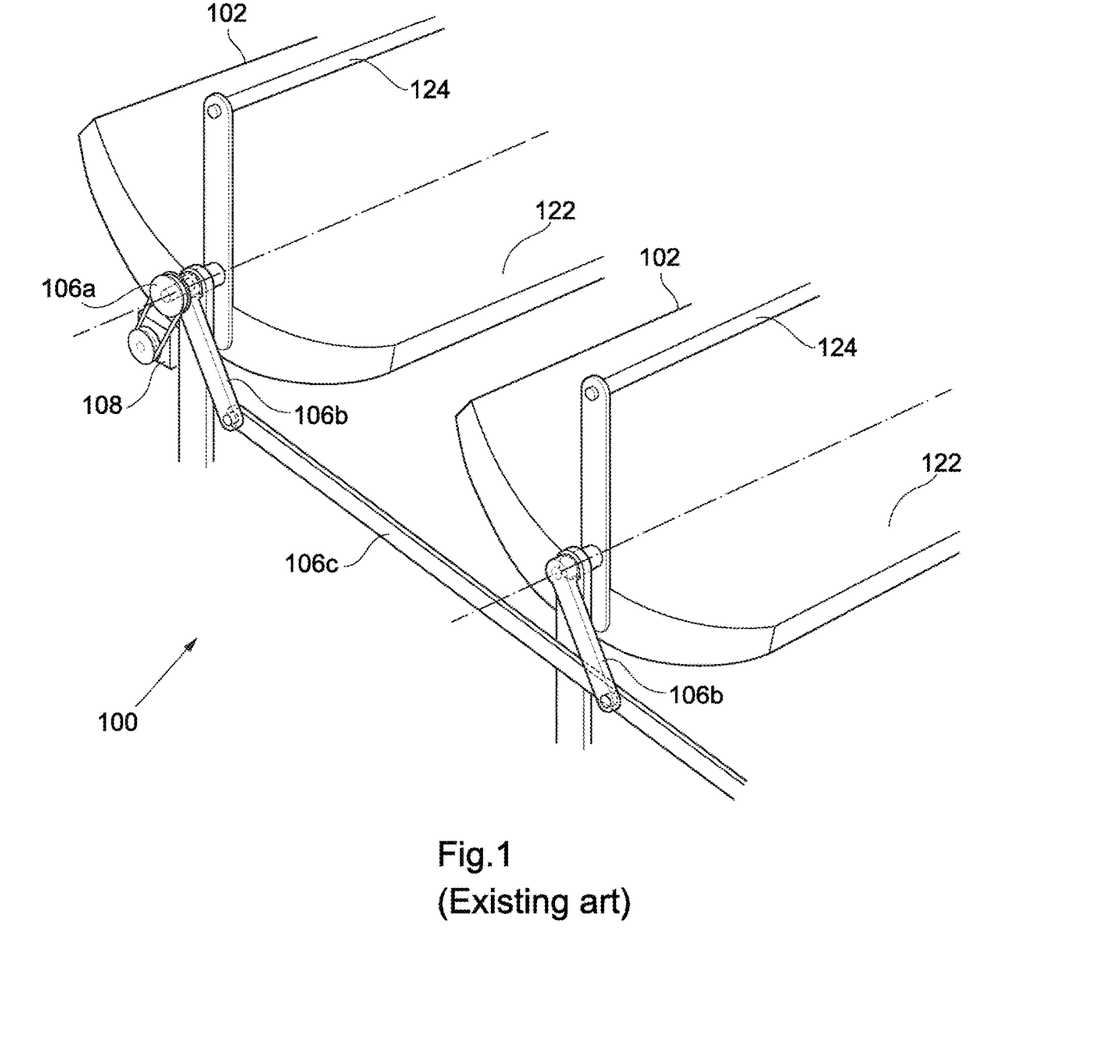
FIG. 1 is a schematic environmental illustration of an arrangement in accordance with existing art.

The term "PTC" (Parabolic Trough solar Collector) will be used in this disclosure to denote a concentrating solar collector with a trough-formed reflector arranged to concentrate solar light onto a fluid tube. A PTC comprises an elongated reflector, which reflective surface in a cross-section describes a parabolic curve. The reflector focuses direct sunlight on a focus. In mathematical terms, such parabola has the properties "curve", "focus", "Latus rectum", and "optical axis of symmetry". The parabolic through's "optical plane of symmetry" is defined by extending the parabolas axis of symmetry along the longitudinal direction of the trough. With reference to FIG. 1, which is a schematic illustration in a perspective view, an existing thermal solar energy system 100 will now be described, according to an example.

The thermal solar energy system 100 comprises a plurality of PTCs 102 where each respective of the PTCs 102 comprises a parabolic reflector 122 and a fluid tube 124. The thermal solar energy system 100 further comprises a solar tracking arrangement. In FIG. 1, the solar tracking arrangement is illustrated as a motor 108 with transmission means 106a, 106b, and 106c. An operating movement caused by the motor 108 is conveyed by the transmission means 106a into a pivoting movement of the first PTC 102 about its pivot axis (dash-dotted line) to direct the first PTC 102 towards the direct sunlight from the sun. The further transmission means 106b, 106c are links arranged to link the first PTC 102 to further parallel arranged PTCs 102, such that the operating movement caused by the motor 108 is also conveyed to respective pivoting movements of the further PTCs 102 about their respective pivot axes.

The solar tracking arrangement enables one motor 108 to control a plurality of PTCs 102, by simultaneously pivoting the respective PTCs 102 toward the direct sunlight. Thereby, as well costs for installation and maintenance of drive means, i.e. motors, etc., could be reduced.

An example of a solar collector system is disclosed in the patent publication EP 2 466 225, A1.

It is a challenge to improve efficiency in solar energy production further.

SUMMARY

It would be desirable to increase the heat output in thermal solar energy systems. It is an object of this disclosure to address at least one of the issues outlined above.

Further there is an object to provide a mechanism that appropriately controls angular positioning of parabolic trough solar collectors. These objects may be met by an arrangement according to the attached independent claims.

According to a first aspect, a solar tracking arrangement is provided for enabling a plurality of parallel arranged PTCs (Parabolic Trough solar Collectors), to be directed towards the travelling sun. The solar tracking arrangement is connectable to the PTCs and comprises: a drive means, a transmission means, and a plurality of conversion means. The transmission means are connected with the drive means and to each of the plurality of conversion means. The transmission means is configured to convey an operating movement caused by the drive means to the plurality of conversion means, and each of the conversion means is configured to convert the conveyed operating movement into a pivoting movement of a respective one of the plurality of PTCs about a focus line, such that each of the pivoting movements directs the optical plane of symmetry of the respective PTC towards the travelling sun. One or more of the conversion means is adjustably connected with the transmission means in a direction along the transmission means to enable individual angular position adjustment of the respective one of the plurality of PTC's.

Furthermore, the transmission means may comprise a tracking beam for connecting the conversion means to the drive means. Each of the conversion means may comprise a respective flexible member, e.g. a wire or a belt, and be configured to be looped around a corresponding conversion means, e.g. a drum or a shaft, of the respective PTC to convert the operating movement caused by the drive means to the pivoting movement of the respective PTC. Looping the conversion means around the corresponding conversion means may facilitate that the PTCs will be reliably positioned in the support structure, which make the thermal solar energy system more robust.

The lengths of the conversion means may enable the PTCs to pivot more than 180° about its focus line, and preferably more than 270°. Thereby, the PTCs could be pivoted further such that condensation within the troughs and cooling of the reflectors due to heat radiation from the PTCs may be limited at night. In addition, The PTCs may be protected from hard weather and pollution.

Moreover, tensioning means may be arranged for affecting the transmission means with a counterforce, e.g. as transmission tensioning means or as respective trough tensioning means at the different PTCs.

According to a second aspect, a thermal solar energy system is provided, that comprises a support structure, a plurality of PTCs, and a solar tracking arrangement according to any above defined aspects. The plurality of PTCs are arranged in parallel with each other at the support structure, and the solar tracking arrangement is connected to the plurality of PTCs.

By arranging individually adjustable conversion means, the different PTCs may have their respective angular directions adjusted. Thereby, improved precision when directing the PTCs may be achieved, e.g. due to various tolerances and irregularities being compensated for. In addition, the design where the conversion means are looped around corresponding conversion means of the PTCs may enable the solar tracking arrangement to be compact and less complexly arranged. For instance, the solar tracking system may be arranged within a support structure, and thereby be protected against hard weather, pollution, etc., which may reduce maintenance and service needs. Even if the solar tracking arrangement by mistake was referred to as a solar tracking "system", when reading this description, it is obvious from its context that "solar tracking arrangement" that was mentioned instead. The solar tracking arrangement is intended to be arranged in a thermal solar energy system.

BRIEF DESCRIPTION OF DRAWINGS

The solution will now be described in more detail by means of exemplifying embodiments and with reference to the accompanying drawings, in which.

DETAILED DESCRIPTION

Solar tracking arrangements for Parabolic Trough solar Collector, i.e. PTCs, and thermal solar energy systems with PTCs will be described in this disclosure.

In the proposed solar tracking arrangement, a one-dimensional operation movement is transmitted via a transmission means and converted into pivoting movements of the PTCs when conversion means of the solar tracking arrangement cooperate with corresponding conversion means of the PTCs. The conversion means of the solar tracking arrangement are adjustably connected to the transmission means to facilitate individual adjustment of angular positions of the PTCs.

In mechanical engineering, play, sometimes called lash or backlash, is a clearance or lost motion in a mechanism caused by gaps between mechanical parts. In a solar tracking mechanism, such play may introduce tracking errors as the signals to operate the movement of the drive means is not corresponding exactly to the position of the PTC.

Play in a PTC solar tracking system, i.e. a PTC solar tracking arrangement, can be defined as the maximum distance or angle through which any part may be moved in one direction without applying appreciable force or motion to the next part in mechanical sequence.

The innovative concept is to increase precision of tracking system by using tensioning means to create a situation where the force of the tracking system's drive means is never reversed, no matter the direction of pivotation or the position of the PTC during daily operation, and the torque from the PTC is not reversed during operation thus reduce the effect of play.

In the following exemplifying embodiments, the displaced centres of gravity are accomplished by arranging trough tensioning means at the PTCs. The trough tensioning means are implemented as any of: specific weights applied on the PTCs, asymmetrically designed reflectors of the PTCs across their optical planes of symmetry, or combinations thereof.

In some of the accompanying figures, a vertical line v and a horizontal line h of the environment are illustrated. In comparison with the reflectors' surfaces, which optical axes of symmetry y and corresponding optical planes of symmetry y, varies with the pivoting PTCs during a day, the vertical line v and the horizontal line h do not change directions.

With reference to the FIGS. 2a-c, which are schematic illustrations, a solar tracking arrangement 300 will now be described in accordance with some exemplifying embodiments.

Figure 2A:
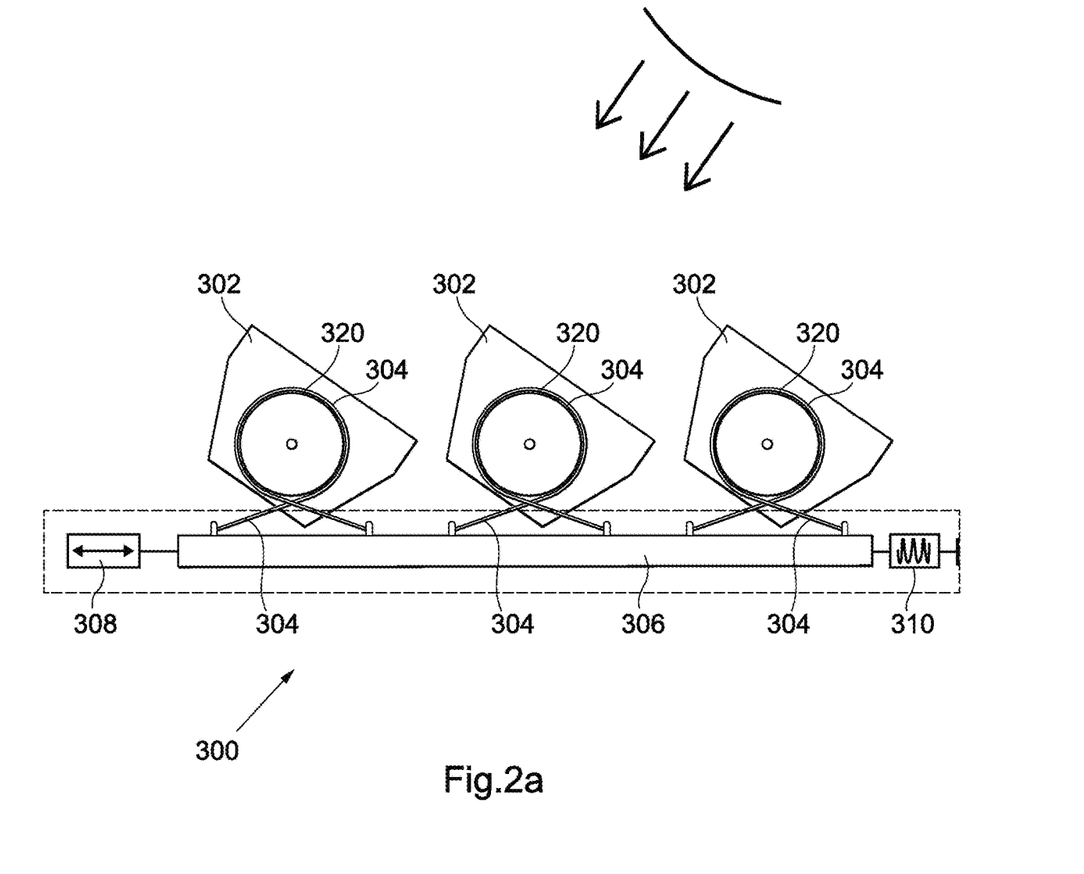
FIGS. 2a-c are schematic illustrations of arrangements, according to possible embodiments.

FIG. 2a, schematically illustrates a situation where a solar tracking arrangement 300 is applied and operates on a thermal solar energy system, in a side view. The thermal solar energy system comprises a plurality of PTCs (Parabolic Trough solar Collectors) 302 arranged in parallel.

The solar tracking arrangement 300 is connectable to the PTCs 302 to control their pivoting movements for directing the PTCs' 302 apertures towards the direct sunlight from the sun.

The solar tracking arrangement 300 of this embodiment comprises a linear actuator 308 as drive means, a tracking beam 306 as transmission means, and a plurality of wires 304 as conversion means. The linear actuator 308 is connected to the tracking beam 306 and the tracking beam 306 is in turn connected to the plurality of wires 304. Each wire 304 is connectable to a corresponding conversion means 320 of a respective PTC 302, such that an operating movement caused by the linear actuator 308 will result in simultaneous pivoting movements of the respective PTCs 302 about their pivot axes (illustrated as a black dots).

When the linear actuator 308 pushes the tracking beam 306 with a one-dimensional operation movement to the right in FIG. 2a, the tracking beam 306 and the wires 304 force the respective PTCs 302 to pivot counter-clockwise about their pivot axes, but when the tracking beam 306 instead is pulled to the left, the PTCs 302 will pivot clockwise.

As illustrated in the figure, the compact design of the solar tracking arrangement 300, enables the tracking arrangement 300 to be arranged within a support structure (dashed line), where it can be protected from environmental factors, e.g. hard weather, such as storm, sand, dust, rain, and snow, etc. Thereby, service needs may be reduced and the life cycle of the solar tracking arrangement 300 may be prolonged.

One advantage of this and other described embodiments of this disclosure is that when applying a tracking beam 306, i.e. a stiff transmission means, the linear actuator 308 may be connected to act directly on the tracking beam 306. By enabling the linear actuator 308 to directly push of pull the tracking beam 306 without intermediate wires, lines, etc. the operating movement can be transmitted to the tracking beam 306 with higher precision, e.g. because various plays may be reduced or avoided. As a consequence, the PTCs 302 may be operated more accurate and with improved precision.

Traditionally, transmission means has instead been arranged as various combinations of wires, drive rods, and return rods, that are both more complex and introduces various plays in the conveyed operating movements.

The installed PTCs 302 are most effective when they are carefully directed towards the sun. Even if the solar tracking arrangement 300 is designed to direct the PTCs 302 appropriately, external factors such as temperature variations, rain, snow, ice, or air humidity, as well as imperfections in the components' material may affect the respective PTCs 302 such that all PTCs 302 are not optimally directed. It has been observed that even small angular deviations such as 0.1 degree, may result in a noticeable decrease in produced heat.

The wires 304 are therefore adjustably connected to the tracking beam 306, along its length. Thereby, the angular positions of the respective PTCs 302 may be appropriately adjusted when necessary. In this embodiment, fixation points of the tracking beam 306 for fixating the wires 304 are designed movable along the tracking beam 306 to enable individual positional adjustment of the wires 304, without being limited thereto. Alternatively, the fixation points may instead be fixed at the tracking beam 306, but the wires 304 may be enabled to move at the fixation points before being fixed thereto. Regarding both alternatives, the wires 304 may be individually movable, either together with, or within the respective fixation points.

However, the above described components are non-limiting examples of implementations, and the solar tracking arrangement 300 may instead comprise alternative implementations of drive means, transmission means, and conversion means 304 when appropriate, without deviating from the inventive scope. For instance, the drive means may be implemented as a rotating motor, and a rotating operation movement of the motor may be conveyed into a longitudinal movement of the transmission means by a gearwheel and a toothed rack, etc.

In an alternative embodiment, which is based on some above described embodiments, a transmission tensioning means 310 is further arranged to affect the tracking beam 306 with a tensioning force. The tensioning force will be directed opposite to the force by which the linear actuator 308 affects the tracking beam 306, i.e. the operating force. By arranging a transmission tensioning means 310, instead of alternatingly pulling and pushing the tracking beam 306, the linear actuator 308 may operate the tracking beam 306 by constantly pulling it, but instead regulating the operating force's strength. In other words, the operating force of the drive means does not have to change polarity. Therefore, various plays, e.g. originating from the linear actuator 308, the tracking beam 306, the wires 304, or the fixation points, may be compensated for because the operating force will be one-way directed. The transmission tensioning means 310 may be implemented as any suitable spring means or counterweight arrangement when appropriate.

Alternatively, by arranging the transmission tensioning means 310 as a compression spring, the linear actuator 308 may instead be implemented to push the tracking beam 306, without deviating from the inventive scope.

Figure 2B:
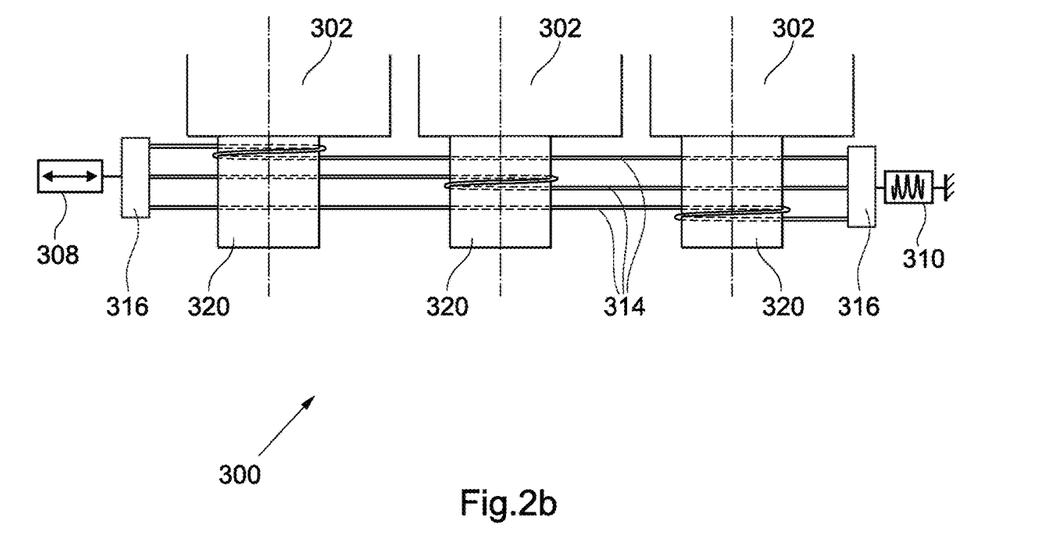

FIG. 2b, schematically illustrates a situation where a solar tracking arrangement 300 is applied and operates on a thermal solar energy system, in a view from above. The thermal solar energy system comprises a plurality of PTCs (Parabolic Trough solar Collectors) 302 arranged in parallel.

This exemplifying embodiment is related to some embodiments described in conjunction with FIG. 2a, and the same reference numbers will therefore be applied when appropriate.

The solar tracking arrangement 300 of this embodiment comprises a linear actuator 308 and a transmission tensioning means 310 corresponding to the linear actuator and the transmission tensioning means shown in FIG. 2a. However, the transmission means and the conversion means are differently implemented. The transmission means is here implemented as a pair of connection bars 316, and the conversion means as longer wires 314. Ends of the longer wires 314 may be inserted through holes of the connection bars 316 and be adjustably fixated.

As illustrated in FIG. 2b, each of the wires 314 is connectable to one corresponding conversion means 320 of a corresponding PTC 302.

In a related embodiment, instead of arranging one linear actuator 308 and one transmission tensioning means 310, the transmission tensioning means 310 may be exchanged with a second linear actuator (not shown). Thereby, the PTCs 302 may be pivoted clockwise by increasing a pulling force of the first linear actuator 308 while decreasing a pulling force or the second linear actuator. I.e. the wires 314 are moved to the left in the FIG. 2b and the PTCs pivots about their focus-lines which coincides with their pivot axes. Correspondingly, the PTCs 302 may be pivoted counter-clockwise by instead decreasing the pulling force of the first linear actuator 308 while increasing the pulling force or the second linear actuator.

Figure 2C:
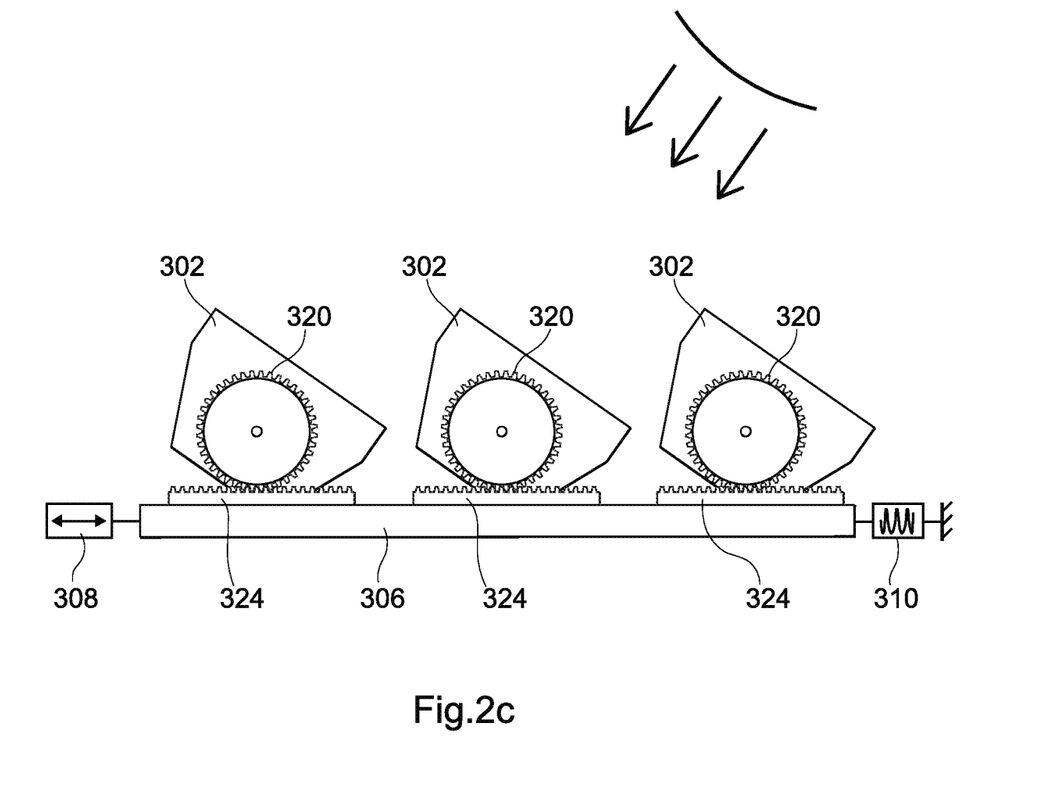

FIG. 2c, schematically illustrates a situation where a solar tracking arrangement 300 is applied and operates on a thermal solar energy system. The solar tracking arrangement 300 is related to the solar tracking system, i.e. the solar tracking arrangement, described in conjunction with the FIGS. 2a and 2b, and the same reference numbers will therefore be applied when appropriate.

The solar tracking arrangement 300 of this embodiment differs from the one illustrated in FIG. 2a in that the conversion means 324 are alternatively designed. In this embodiment, the conversion means 324 are implemented as toothed racks 324, that are arranged to cooperate with corresponding conversion means 320 of the PTC 302, where the conversion means 320 of the PTCs 302 have longitudinal elevations and recesses provided on its outer surface, adapted to be operated by the toothed racks 324. The toothed racks 324 are adjustable fixated to the tracking beam 306 by means of screws and corresponding holes through the tracking beam 306 and the toothed racks 324. In order to make the fixation adjustable along the tracking beam 306, either of the holes in the tracking beam 306, or the holes in the toothed racks 324 could be extended in the tracking beam's 306 longitudinal direction.

Figure 3A:
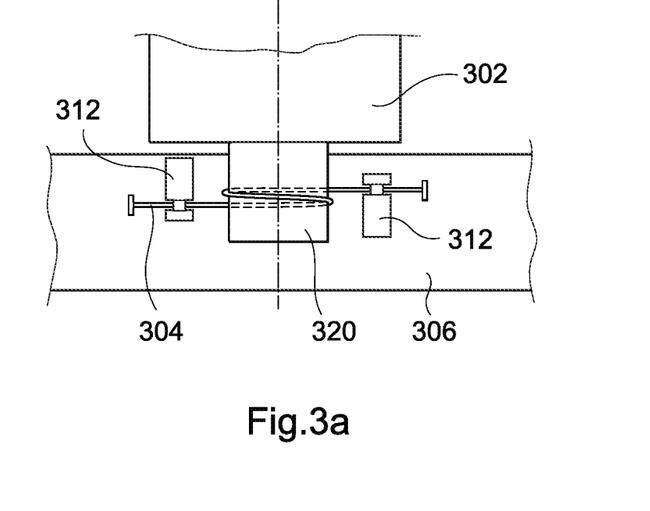
FIGS. 3a-b are schematic illustrations of details, according to possible embodiments.

FIG. 3a, which is a schematic view from above, illustrates a detail of a solar tracking arrangement, in accordance with one exemplifying embodiment.

This embodiment is related to some above described embodiments, and the same reference numbers have been applied when appropriate.

In FIG. 3a, the tracking beam 306 is equipped with a pair of asymmetrically arranged rollers 312 that guide the wire 304 by means of respective transversal grooves. By arranging the rollers 312 appropriately, the wire 304 will be prevented from coming in contact with itself when being looped around the conversion means 320 of the PTC 302. Thereby, risks of mechanical wear or damage of the wire 304 will be reduced which else could have lead to reduced performance of the pivoting movement of the PTC 302.

Figure 3B:
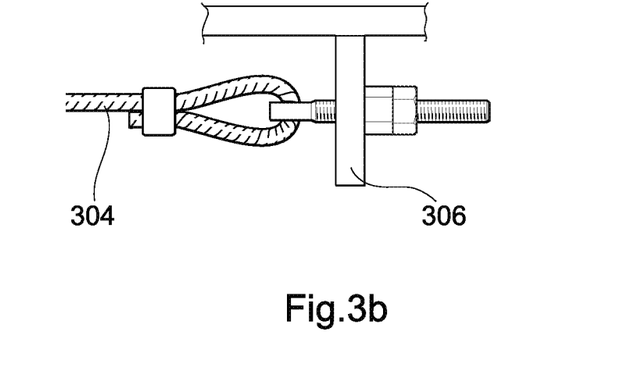

FIG. 3b, which is a schematic view from a side, illustrates a detail of a solar tracking arrangement, in accordance with one exemplifying embodiment.

This embodiment is related to some above described embodiments, and the same reference numbers have been applied when appropriate.

In FIG. 3b, the wire 304 is fixated to the tracking beam 306. One end of the wire 304 is equipped with a threaded rod that is inserted in a hole of the tracking beam 306. Two nuts are fixating the threaded rod to the tracking beam 306. By screwing the left nut, the tension of the wire 304 may be adjusted. The right nut may then be screwed to lock the left nut in position and prevent it from loosen.

Figure 4A:
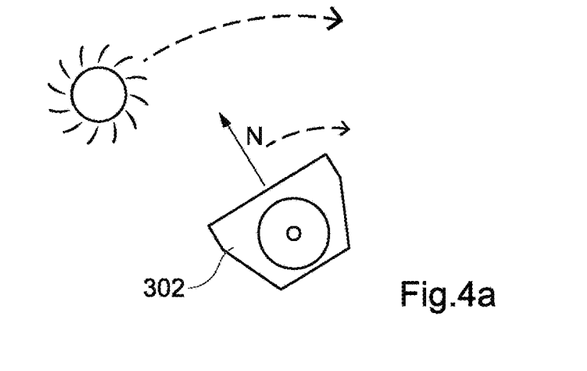
FIGS. 4a-c are schematic illustrations of an arrangement in operation, according to possible embodiments.
Figure 4B:
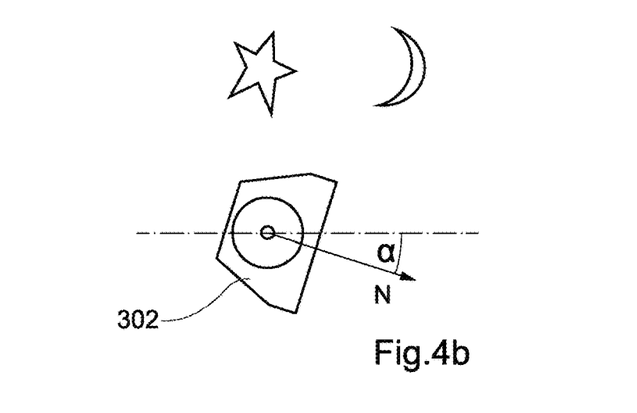
Figure 4C:
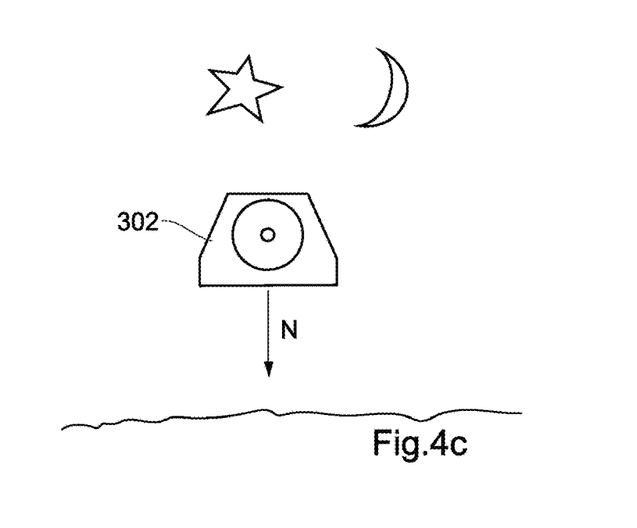

FIGS. 4a-c, which are schematic views, illustrates some functionality of a solar tracking arrangement, according to one exemplifying embodiment.

In FIG. 4a, a PTC 302 is illustrated which in operation during a day is tracking the sun. In order to track the sun from dusk to dawn, the PTC 302 will be pivoted 180° about its longitudinal pivot axis, i.e. the focus-line. In other words, the direction of the PTC's 302 optical plane of symmetry will variate up to 180° during a day. With conventional tracking means it has been problematic to achieve large variations for the optical planes of symmetry, especially for PTCs where the respective pivot axes and the focus-lines do not coincide. In this embodiment, the PTCs 302 are spatially symmetric about their respective optical planes of symmetry, and their normals N coincide with their optical axes of symmetry.

However, as described above, by providing the solar tracking arrangements 300 with appropriately long conversion means 304, 314, 324, the PTCs 302 will be enabled to pivot more than 180°.

In FIG. 4b, the PTC 302 is illustrated when in a night mode. At night, the surrounding temperature decreases and achieves a cooling effect of the PTC 302. This cooling effect may give rise to condensation inside the trough which may deteriorate its reflector. By designing the conversion means with such a length that the PTC 302 may be pivoted further, i.e. below the horizontal line, the cooling effect of the PTC will be limited. In FIG. 4b, the PTC 302 has been pivoted an angle α below horizontal line.

In FIG. 4c, the PTC 302 is illustrated when in a storm mode. By designing the conversion means of the solar tracking arrangement with a length such that the PTCs 302 may be enabled to rotate about 270°, they can be pivoted both to face the travelling sun during the day, but also be protected against bad weather, such as wind, snow, ice, rain, sand-storms, dust, pollution, etc.

In some above described embodiments, a transmission tensioning means 310 has been arranged in order to compensate for various plays in transmission and conversion, e.g. caused by variations in temperature or imperfections in materials or components. However, another implementation of means for compensation for various plays will now be described below.

Figure 5A:
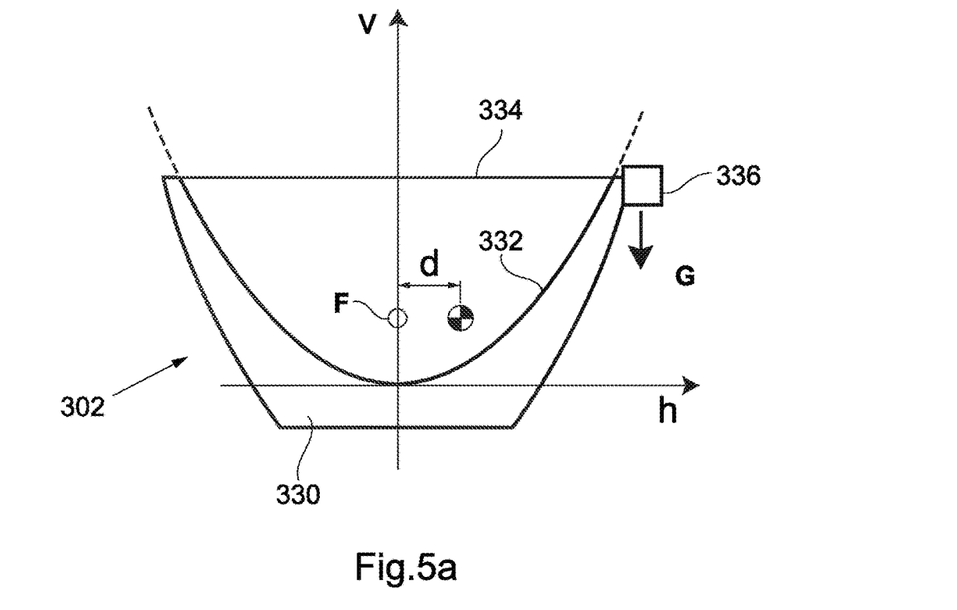
FIGS. 5a-b are schematic illustrations arrangements, according to possible embodiments.

With reference to FIG. 5a, which is a schematic cross-sectional view, a PTC (Parabolic Trough solar Collector) 302 will now be described in accordance with one exemplifying embodiment.

The PTC 302 comprises a reflector 332, a support 330, and a cover glass 334. The reflector 332 reflects direct sunlight and focuses on a focus-line F. The reflector 332 is elongated and its cross-section follows a curve.

In this embodiment, the curve of the reflector surface's cross-section is $y=x^2$, without being limited thereto. In the figure, the PTC 302 is directed such that the optical axis of symmetry for the curve is parallel with the vertical line v.

A trough tensioning means 336 in form of a weight is applied at a long edge of the PTC 302, and because the gravity force G acts at the trough tensioning means 336, the PTC's 302 centre of gravity when the weight is applied will be displaced from the optical axis of symmetry, with an offset d.

The weight is to be interpreted as a generic example of the trough tensioning means 336. As an alternative implementation, the weight may be designed as two elongated edges of the PTC 302, where the effect of the weight is achieved by a weight difference between the two edges. Typically, in FIG. 5a, the right edge is heavier than the left edge, to implement the trough tensioning means 336.

Figure 5B:
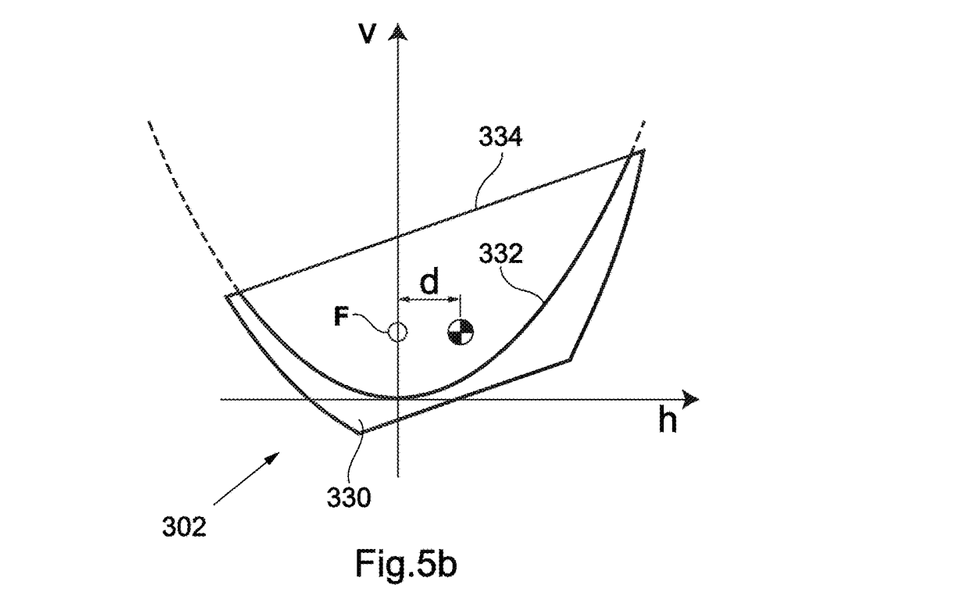

FIG. 5b, which is a schematic cross-sectional view, a PTC 302 will now be described in accordance with one exemplifying embodiment.

This embodiment differs from the above described one in that the trough tensioning means is achieved by designing the PTC 302 with a larger portion located at a first side of the PTC's 302 optical axis of symmetry, and a smaller portion on a second side of the PTC's 302 optical axis of symmetry.

The larger portion of the PTC 302 is heavier than the smaller portion of the PTC 302, e.g. because it will comprise more material of the cover glass 334, the reflector 332, and the support (s). Therefore, by designing the PTC 302 as illustrated in FIG. 5b, the effect of a trough tensioning means is achieved by the components of the PTC 302 itself. Thus, the trough tensioning means is accomplished by the mass difference between the two portions.

The structure of the described non-symmetric cut Parabolic Trough solar Collector is further disclosed in the related co-pending patent application PARABOLIC TROUGH SOLAR COLLECTOR, with the same filing date as this patent application.

Regarding the above described trough tensioning means 336 of FIGS. 5a and 5b, they may be applied as well as an alternative to the transmission tensioning means 310, but also as a complement thereto. By applying individual adapted trough tensioning means 336, the different PTC's 302 respective centres of gravity may be individually adjustable, which may be advantageous, e.g. to compensate for various differences between the PTCs 302.

Figure 6:
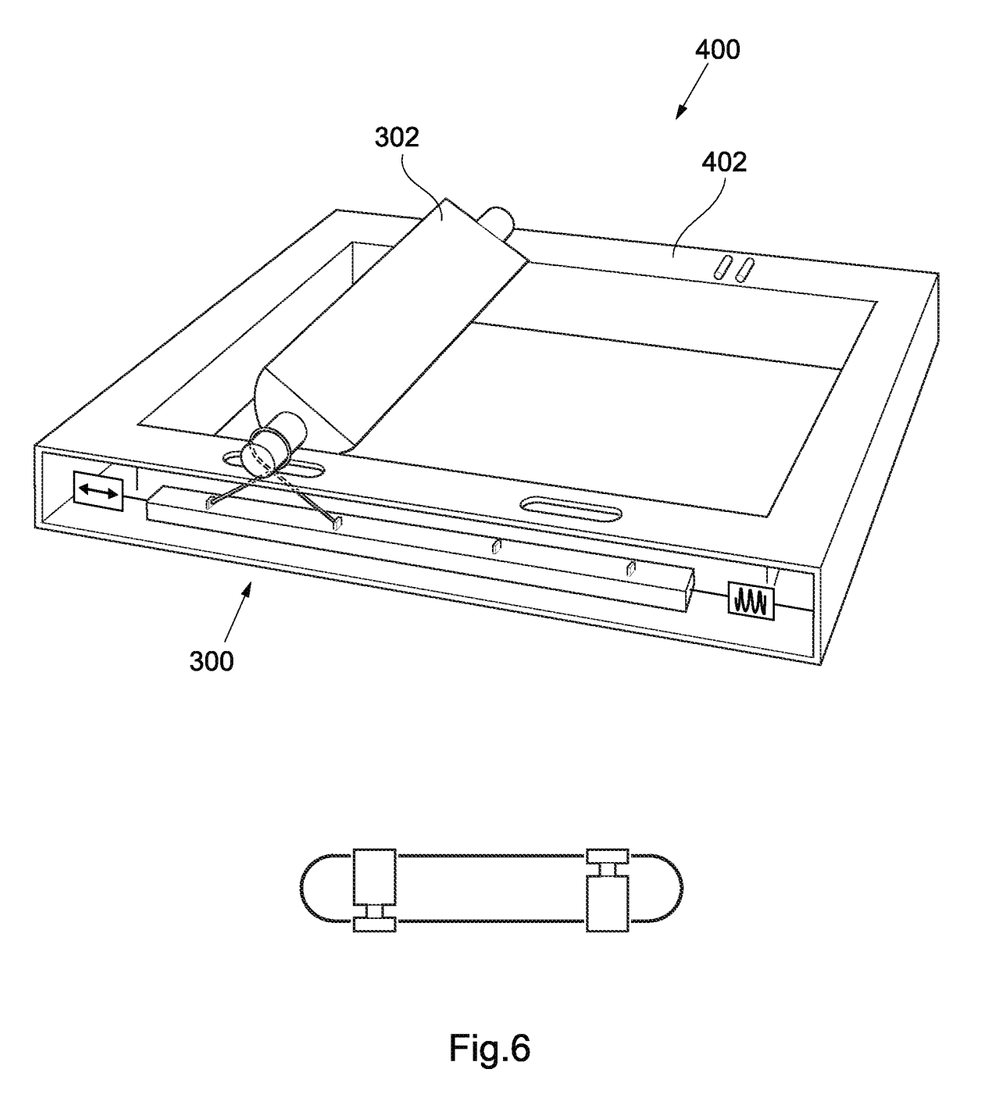
FIG. 6 is a schematic illustration of a thermal solar energy system, according to a possible embodiment.

With reference to FIG. 6, which is a schematic perspective view, a thermal solar energy system 400 will now be described in accordance with one exemplifying embodiment.

The thermal solar system 400 comprises a plurality of PTCs 302, a support structure 402 and a solar tracking arrangement 300. However, only one PTC 302 is shown in FIG. 6. The solar tracking arrangement 300 as such has already been disclosed above in conjunction with some embodiments and will not be further discussed in this embodiment. This embodiment is an example how the solar tracking arrangement 300 is applied to a support structure 402. When in operation, typically, the support structure has a side cover such that the solar tracking arrangement 300 will be protected, e.g. from bad weather.

As seen in the figure, the wire of the solar tracking arrangement 300 is guided through an elongated hole of the support structure 402 and looped around a corresponding conversion means of the of the PTC 302. In FIG. 6 is also an empty location for a further PTC 302 shown. The further PTC 302 may then be arranged at supporting rollers in its ends.

A detail of the elongated hole is further illustrated below the main figure. Here a pair of rollers with guiding recesses for the wire is shown.

The thermal solar system 400 described above, typically comprise further components and means to provide ordinary functionality at operation, e.g. various tube connectors, heat fluids, pumps, control means, heat exchangers, etc.

However, in order to facilitate the understanding of the proposed solar tracking arrangement 300, any such components and means, which do not directly contribute to the functionality of pivoting the PTCs 302 when tracking the sun, has been omitted in this disclosure. For instance, typically, the drive means will be controlled by a computer and receive appropriate control signals, e.g. in accordance with performed measurements or estimates.

Reference throughout the specification to "one embodiment" or "an embodiment" is used to mean that a particular feature, structure or characteristic described in connection with an embodiment is included in at least one embodiment.

Thus, the appearance of the expressions "in one embodiment" or "in an embodiment" in various places throughout the specification are not necessarily referring to the same embodiment. Further, the particular features, structures or characteristics may be combined in any suitable manner in one or several embodiments. Although the present invention has been described above with reference to specific embodiments, it is not intended to be limited to the specific form set forth herein. Rather, the invention is limited only by the accompanying claims and other embodiments than the specific above are equally possible within the scope of the appended claims. Moreover, it should be appreciated that the terms "comprise/comprises" or "include/includes", as used herein, do not exclude the presence of other elements or steps.

Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

The scope is generally defined by the following independent claims. Exemplifying embodiments are defined by the dependent claims.

The invention claimed is:

1. A solar tracking arrangement for enabling a plurality of parallel arranged Parabolic Trough solar Collectors, PTCs, to be directed towards the travelling sun, the solar tracking arrangement being connectable to the PTCs and comprises:
    a drive element,
    a transmission element, and
    a plurality of conversion elements,
the transmission element being connected with the drive element and to each of the plurality of conversion elements, the transmission element being configured to convey an operating movement caused by the drive element to the plurality of conversion elements, and each of the conversion elements being configured to convert the conveyed operating movement into a pivoting movement of a respective one of the plurality of PTCs about a focus line, such that each of the pivoting movements directs the optical axis of symmetry of the respective PTC towards the travelling sun, wherein one or more of the conversion elements is adjustably fixated to the transmission element in a direction along the transmission element to enable individual angular position adjustment of the respective one of the plurality of PTC's, and wherein each of the conversion elements is configured to cooperate with a circular circumference of a corresponding conversion element of the respective PTC.

2. The solar tracking arrangement according to claim 1, wherein the drive element comprises a linear actuator and the transmission element comprises a tracking beam, wherein the linear actuator is configured to cause the operating movement as a one-dimensional movement in a direction along the tracking beam, the linear actuator and the tracking beam being connected to each other such that the one-dimensional operating movement is conveyed to the tracking beam.

3. The solar tracking system according to claim 1, wherein the transmission element comprises a tracking beam connecting the conversion elements to the drive means.

4. The solar tracking arrangement according to claim 1, wherein each of the conversion elements comprises a respective flexible member and each of the flexible members is configured to be looped around a corresponding conversion element of the respective PTC to convert the operating movement caused by the drive means to the pivoting movement of the respective PTC.

5. The solar tracking arrangement according to claim 1, wherein the drive element is configured to cause the operating movement as a one-dimensional movement in a direction along the transmission element.

6. The solar tracking arrangement according to claim 1, wherein a length of the respective conversion element enables each of the PTCs to pivot more than 180° about its focus line, and preferably more than 270°.

7. The solar tracking arrangement according to claim 1, further comprising a transmission tensioning element configured to affect the transmission element with a counterforce to a force by which the drive element causes the operating movement.

8. The solar tracking arrangement according to claim 7, wherein the transmission tensioning element comprises a spring member from a set of: a gas spring, a hydraulic spring, a coil spring, and a plate spring, or a counterweight.

9. The solar tracking arrangement according to claim 1, comprising a trough tensioning element configured to be arranged at one of the plurality of PTCs to introduce a compensation torque on the PTC having the trough tensioning element arranged, the compensation torque being directed opposite to, or parallel with, the pivoting movement of the PTC.

10. The solar tracking arrangement according to claim 9, wherein the trough tensioning element includes one or more asymmetrical reflectors.

11. The solar tracking arrangement according to claim 10, wherein the trough tensioning element further includes one or more weights attached to each PTC.

12. The solar tracking arrangement according to claim 1, wherein one of the plurality of PTCs is designed with the centre of gravity located with an offset in relation to the PTC's optical plane of symmetry.

13. A thermal solar energy system comprising:
    a support structure,
    a plurality of Parabolic Trough solar Collectors, PTCs, and
    a solar tracking arrangement according to claim 1, wherein the plurality of PTCs are arranged in parallel with each other at the support structure, and wherein the solar tracking arrangement is connected to the plurality of PTCs.

14. A solar tracking arrangement for enabling a plurality of parallel arranged Parabolic Trough solar Collectors (PTCs) to be directed towards the traveling sun, the solar tracking arrangement being connectable to the PTCs, the solar tracking arrangement comprising:
  a transmission element being connected with a drive element and to each of a plurality of conversion elements, the transmission element being configured to convey an operating movement caused by the drive element to the plurality of conversion elements, and each of the conversion elements being configured to convert the conveyed operating movement into a pivoting movement of a respective one of the plurality of PTCs about a focus line, such that each of the pivoting movements directs the optical axis of symmetry of the respective PTC towards the travelling sun,
  wherein each of the plurality of conversion elements are adjustably fixated to the transmission element in a direction along the transmission element to enable individual angular position adjustment of the respective one of the plurality of PTCs, further wherein each of the plurality of conversion elements is configured to interact with a circular circumference of a corresponding conversion element of the respective PTC, and further wherein each of the plurality of conversion elements is individually adjustable.

15. The solar tracking arrangement according to claim 14, wherein a trough tensioning element includes one or more asymmetrical reflectors.

16. The solar tracking arrangement according to claim 15, wherein the trough tensioning element further includes one or more weights attached to each PTC.

17. The solar tracking arrangement according to claim 14, wherein the drive element comprises a linear actuator and the transmission element comprises a tracking beam, wherein the linear actuator is configured to cause the operating movement as a one-dimensional movement in a direction along the tracking beam, the linear actuator and the tracking beam being connected to each other such that the one-dimensional operating movement is conveyed to the tracking beam, by the linear actuator acting directly on the tracking beam.

* * * * *